United States Patent [19]
Becker

[11] 3,799,291
[45] Mar. 26, 1974

[54] LUBRICATING DEVICE FOR A Z-DRIVE FOR SHIPS

[75] Inventor: Josef Becker, Spay/Rhein, Germany

[73] Assignee: Schottel-Werft Josef Becker KG, Spay/Rhein, Germany

[22] Filed: Mar. 2, 1971

[21] Appl. No.: 231,227

[30] Foreign Application Priority Data
Mar. 5, 1971 Germany.................. 7108306[U]

[52] U.S. Cl. ............................. 184/6.18, 115/17
[51] Int. Cl. ............................................ F16n 7/14
[58] Field of Search............... 184/6.18, 6.12, 6.28; 123/196 W, 196 AB; 308/134.1; 115/17

[56] References Cited
UNITED STATES PATENTS

| | | | |
|---|---|---|---|
| 2,918,986 | 12/1959 | Leipert ............................. | 184/6.18 |
| 3,042,146 | 7/1962 | Shimanckas ....................... | 184/6.18 |
| 2,969,763 | 1/1961 | Foster .............................. | 115/17 X |
| 1,822,573 | 9/1931 | Fitzgerald et al. ................ | 115/17 X |
| 1,446,775 | 2/1923 | Wahl............................... | 123/196 N |
| 2,440,338 | 4/1948 | Kincannon....................... | 115/17 X |

Primary Examiner—Manuel A. Antonakas
Attorney, Agent, or Firm—Woodhams, Blanchard & Flynn

[57] ABSTRACT

Lubricating system especially applicable to an outboard-inboard marine drive system. The entire power train housing is filled with lubricant to a point above the upper gears therein and the rotation of the drive shaft is utilized to pump lubricant through suitable separate channels from the relatively cool underwater housing to the relatively hot above water gear box and return, thereby providing a constant flow through the underwater housing for cooling same, a constant supply of cool oil to the upper gear box and a constant circulation thereof to prevent localized overheating. In the specific embodiment here disclosed the vertical drive shaft is hollow and utilized for the upflowing oil while the channel outside thereof and including the bearings therefor are utilized for the downflowing oil. A suitable impeller is placed on the drive shaft to cause the circulation.

7 Claims, 1 Drawing Figure

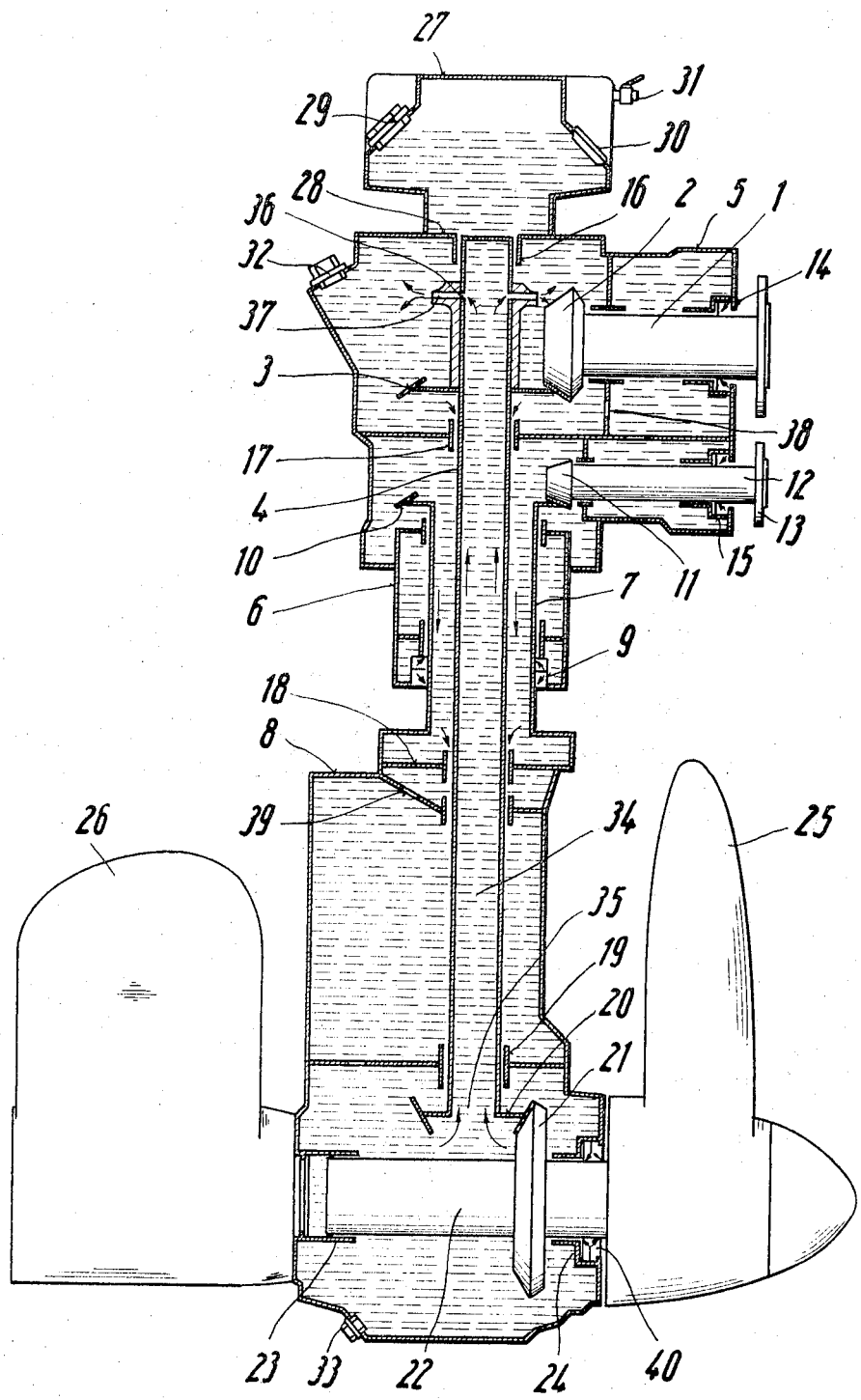

LUBRICATING DEVICE FOR A Z-DRIVE FOR SHIPS

The invention relates to a lubricating device for a drive mechanism of Z-construction for a ship propeller, particularly a steerable propeller.

The basic purpose of the invention is both to safely lubricate a drive mechanism of the above-described type and also to prevent corrosion of the drive elements both during standing and during operation. During standing, the corrosion prevention is a particularly difficult problem because of a tendency to form condensate water. The purpose is attained by simple means, wherein the temperature of the lubricant does not exceed an acceptable value.

The basic purpose of the invention is attained by providing the connecting shaft (which connects the upper part of the drive mechanism to the lower part and which is directed substantially rectangularly to the substantially horizontally positioned propeller shaft) longitudinally with a bore which connects the lower to the upper part and through which connecting bore lubricant can be conveyed by means of a pump. Both the upper and the lower gear housing are filled with such lubricant with same thus covering the drive elements. This connecting bore does not need to be made in one single working operation. Instead, it can consist for example of a central bore lengthwise the axis of the connecting shaft and of radial bores which connects to the central bore the lower gear housing which is provided below the water level and/or the upper gear housing which is usually above the water level. It is important in the invention that both zones are connected to one another so that a lubricant flow can be provided from the lower gear housing through the connecting bore through the upper gear housing and the bearings and openings in the parts surrounding the connecting shaft back into the lower gear housing through which all gear elements are constantly covered with lubricant and said lubricant is being constantly cooled.

An advantageous construction of the new device consists in arranging the upper outlet opening of the connecting bore near the drive pinion of the upper right angle drive of the Z-drive. Through this the cool lubricant which comes from the lower part of the drive unit is fed directly to the drive elements which transmit the drive output and which are positioned in the warmer part.

This effect is still further increased by the fact that the pump is arranged at the outlet openings. A simple construction is obtained by making the pump a centrifugal pump.

As has already been mentioned, an important part of the invention is that all parts which are inclined to corrode are at all times covered with lubricant. Increased reliability is obtained by providing above the upper gear housing and forming a unit with same a lubricant container with an oil level sight port and/or overflow opening. It is important for the invention that a lockable shutable relief valve is provided in the lubricant container because it is possible for an exclusive pressure to develop in the drive mechanism of the invention during operation thereof.

An important characteristic of the invention consists in providing an oil body sufficient to form a lubricant column reaching from the lower gear housing to a point above the upper gear housing into the lubricant container.

The invention is disclosed in connection with an exemplary embodiment comprising a steerable propeller which is driven by any suitable prime mover (not illustrated), which prime mover is normally positioned in the watercraft. The prime mover drives a drive shaft 1 through conventional (and hence not illustrated) transmission means. Said drive shaft carries at its free end the drive pinion 2 of a right angle drive. Same mates with a bevelled gear 3 which is secured in a suitable manner on a connecting shaft 4. The right angle drive thus provided comprises the upper part of the drive mechanism of the steerable propeller. The elements of the right angle drive are supported in an upper gear housing 5 which is mounted on the watercraft. The upper gear housing extends downwardly into a bearing device 6. A neck 7 is rotatably supported in said bearing device which neck comprises the upper part of a lower gear housing 8 or is connected to it. The bearing device 6 and the neck 7 are sealed against the outside by seals 9. A control bevel gear 10 is provided on the upper end of the neck. A control pinion 11 mates with the control bevel gear and is positioned at the end of a control shaft 12 which is connected by means of a coupling 12 to a known and therefore not illustrated control drive mechanism which is used to rotate the lower housing and by it the propeller described hereinafter to thus steer the watercraft. The drive shaft 1 and the control shaft 12 are sealed in the housing through shaft packings 14,15. The connecting shaft is supported by bearings 16,17 in the upper gear housing and extends into the lower gear housing 8 where it is further supported by bearings 18,19. A bevel gear 20 is secured to the lower end of the connecting shaft, which bevel gear mates with a bevel drive gear 21. Said latter is keyed onto a propeller shaft 22 or is connected to it in any other suitable manner. The propeller shaft is supported in the lower gear housing by bearings 23,24 and is positioned approximately horizontally when the connecting shaft is approximately vertical. The propeller shaft is sealed with respect to the outside by a seal 40. All seals 9,40 which are provided below the water level are arranged to seal against pressure peaks whether they come from the outside or the inside. The propeller 25 is positioned on the propeller shaft. The lower gear housing is provided on the side remote from the propeller with a known support fin 26. A lubricant container 27 is positioned on the upper gear housing, which container is continuously connected to the upper gear housing by one or more openings 28. It may also be positioned higher than illustrated so that, if necessary, a higher static pressure can be obtained. The lubricant container is provided with a fill plug 29, an oil sight port 30 and a relief valve 31. The sight port 30 is used to control the oil level and to check the oil discoloration so that one can determine whether, and how much, water has penetrated into the emulsifiable oil being used.

Further, the upper gear housing is provided with a closable opening 32 for introducing lubricant into the system for checking the lubricant level or for venting the upper gear housing. A threaded drain plug 33 is provided in the lower gear housing.

The connecting shaft 4 is provided with a central bore 34 which has an opening 35 at its lower end communicating with the lower gear housing. A centrifugal pump 36 is arranged on the connecting shaft 4 at the upper end thereof near the drive pinion 2, which pump is connected to the central bore 34 through radial openings 37.

The lubricant container, the upper gear housing, the lower gear housing and all their chambers are connected through suitable openings, for example 38,39, and through the bearings.

The entire steerable propeller, namely all chambers above-mentioned, are filled with lubricant until the lubricant level can be seen on the sight port 30 or preferably corresponds there with a mark. Thus all gear parts of the steerable propeller are under lubricant both during standstill and during operation so that condensate water formation and corrosion is avoided. However, in this arrangement as thus far stated the lubricant would become too warm during operation. In order to prevent this, the central bore and the centrifugal pump are provided. Thus, the centrifugal pump draws at all times cool oil from the lower gear housing below the water level through the openings 37, the central bore 34 and the opening 35 at the lower end of the connecting shaft and urges it into the upper gear housing. This provides a continuous lubricant cycle in the steerable propeller. It is particularly advantageous that the centrifugal pump 36, particularly the radial openings 37, are arranged adjacent the drive pinion 2 because this arrangement guided the cool lubricant to the heavily loaded gears.

The relief valve is advantageously open during the operation so that any pressure peaks created by the heating of the lubricant can be balanced.

It is also advantageous to provide the drain plug 33 with a magnetic projection or the like in order to collect metallic particles from the gear and to remove same during changing of the oil.

The embodiments of the invention in which an exclusive property or privilege is claimed are defined as follows:

1. A lubricating device for a drive mechanism for driving a propeller of a watercraft, comprising:
   means defining a pair of vertically spaced housings;
   rotatable propeller means mounted on one of said housing means;
   drive means mounted in both of said housing means for effecting a driving of said rotatable propeller means, said drive means including means defining a hollow, rotatable drive shaft extending between said vertically spaced pair of housing means and opening inwardly of each of said pair of housing means to define a first path of fluid communication therebetween and driven gear means for rotating said drive shaft means;
   hollow support means extending between said pair of vertically spaced housings and includes hollow shaft means encompassing said hollow drive shaft means, said support means being radially spaced from said hollow drive shaft means and opening inwardly to said vertically spaced pair of housings to define a second path of fluid communication therebetween;
   securement means for fixedly securing said one of said housing means to said hollow shaft means and bearing means mounted between the other of said housing means and said hollow shaft means for rotatably supporting said hollow shaft means and said one of said housing means relative to said other of said housing means to thereby effect a steering of said watercraft by moving the axis of rotation of said propeller relative to the longitudinal axis of said watercraft;
   liquid lubricating means filling a chamber defined by said vertically spaced pair of housings means and said hollow drive shaft means and said hollow support means and contacting the entirety of said drive means; and
   pump means for circulating said liquid lubricating means in said chamber and between said pair of said vertically spaced housing means through said first and second paths of fluid communication to thereby prevent the formation of localized excessively heated lubricant in said chamber.

2. A lubricating device for a drive mechanism for driving a propeller of a watercraft, comprising:
   means defining a pair of vertically spaced housings;
   rotatable propeller means mounted on one of said housing means;
   drive means mounted in both of said housing means for effecting a driving of said rotatable propeller means, said drive means including means defining a hollow, rotatable drive shaft extending between said vertically spaced pair of housing means and opening inwardly of each of said pair of housing means to define a first path of fluid communication therebetween and driven gear means for rotating said drive shaft means;
   hollow support means extending between said pair of vertically spaced housings and includes hollow shaft means encompassing said hollow drive shaft means, said support means being radially spaced from said hollow drive shaft means and opening inwardly to said vertically spaced pair of housings to define a second path of fluid communication therebetween;
   liquid lubricating means filling a chamber defined by said vertically spaced pair of housings means and said hollow drive shaft means and said hollow support means and contacting the entirety of said drive means; and
   pump means mounted in said other of said housing means for circulating said liquid lubricating means in said chamber and between said pair of said vertically spaced housing means through said first and second paths of fluid communication to thereby prevent the formation of localized excessively heated lubricant in said chamber.

3. A lubricating device according to claim 2, wherein the outlet of said pump means is directed onto said gear means in said other of said housing means.

4. A lubricating device according to claim 2, wherein said pump means is a centrifugal pump secured to said hollow drive shaft means, said outlet of said pump consisting of means defining radially directed openings in said hollow drive shaft means for providing fluid communication from the interior of said hollow drive shaft means to the interior of said other of said housing means whereby liquid lubricating means is pumped from said one of said housing means through said hollow drive shaft means to said other of said housing means.

5. A lubricating device according to claim 2, wherein the upper one of said housing means includes additional means defining at least one of an oil level sight port and an overflow opening.

6. A lubricating device according to claim 5, wherein a relief valve is provided on said upper one of said housing means.

7. A lubricating device according to claim 5, wherein said liquid lubricating means is an oil; and wherein said additional means defines said oil level sight port; and wherein the presence of a quantity of said oil extends from the lower one of said housing means to said upper one of said housing means to a level visible through said sight port.

* * * * *